United States Patent Office 3,595,748
Patented July 27, 1971

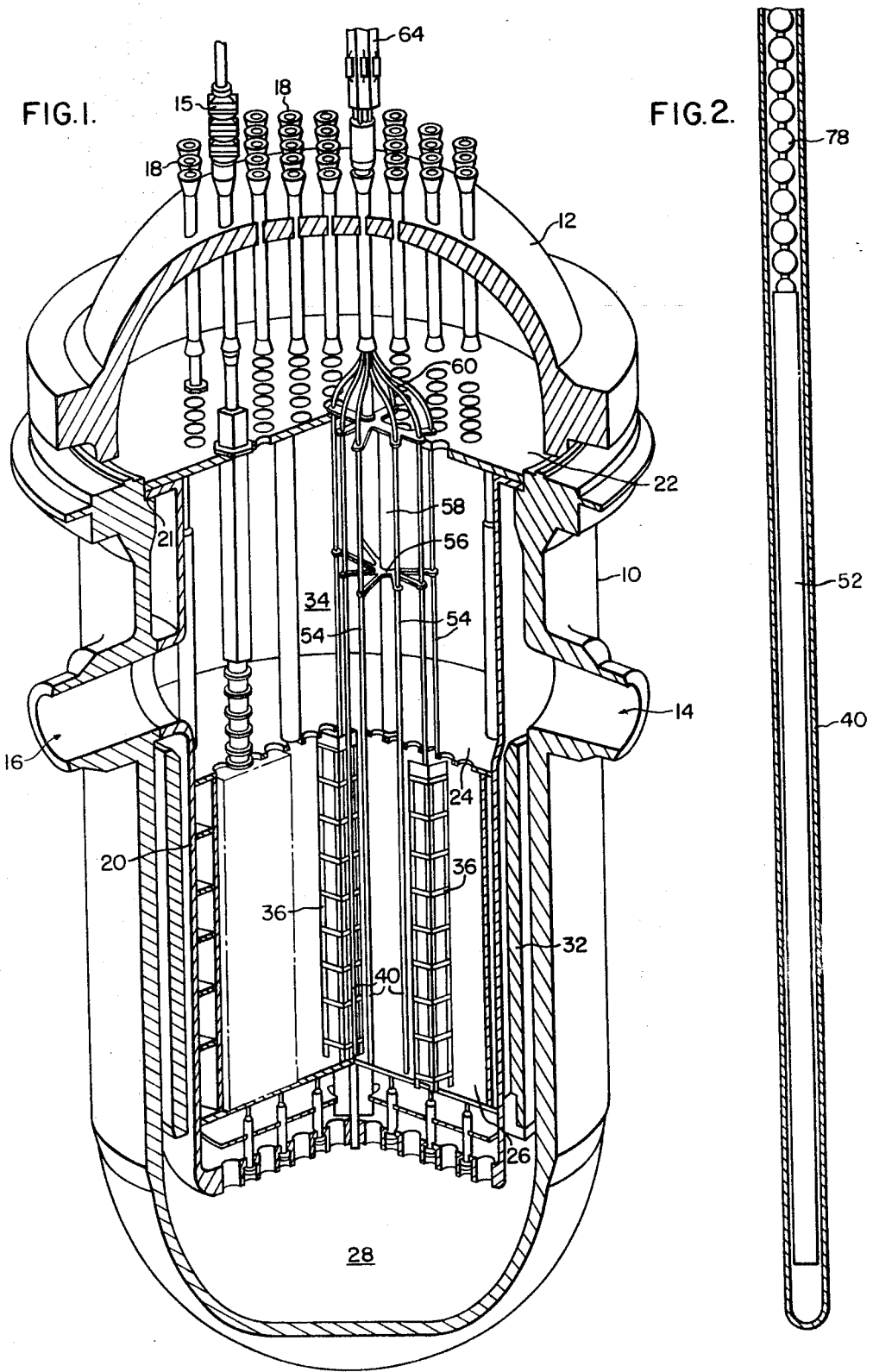

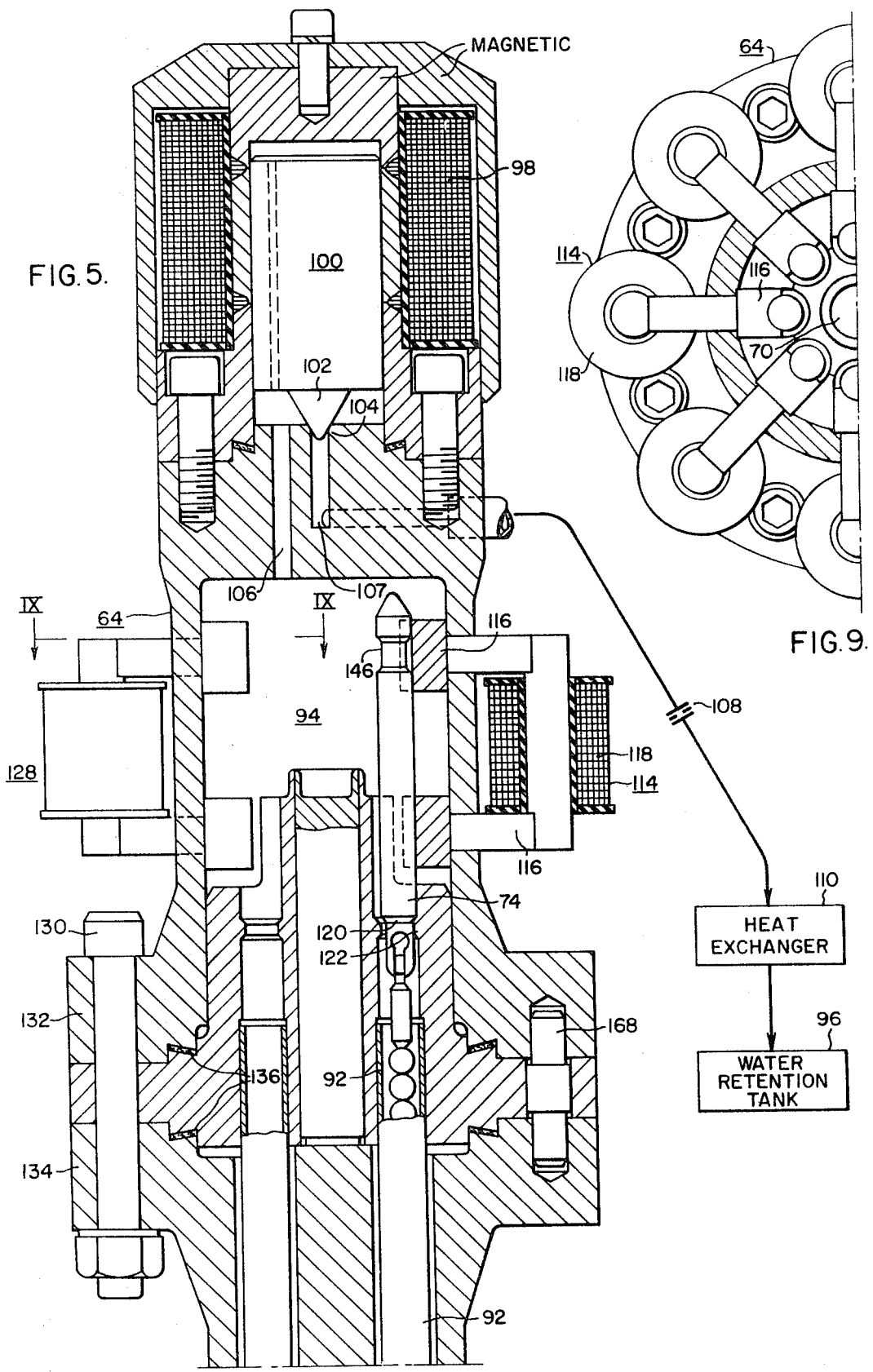

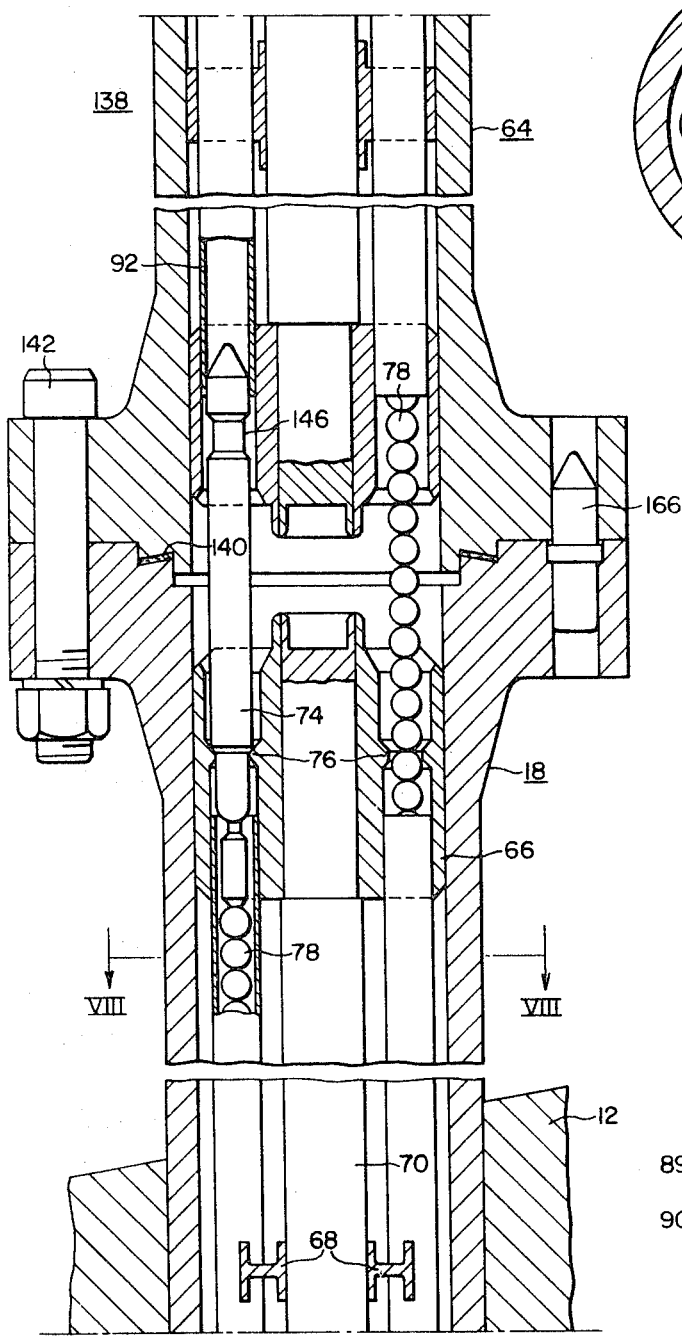
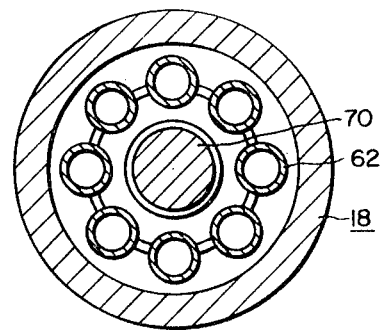
FIG.8.
FIG.6.
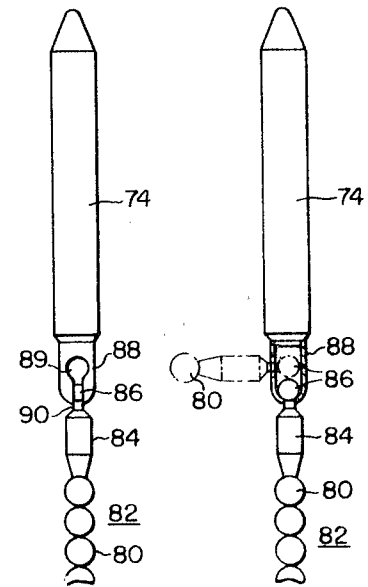
FIG.10.   FIG.11.

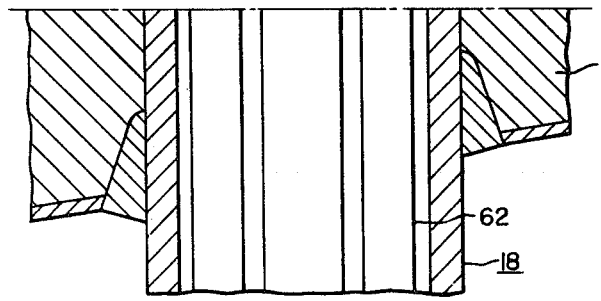
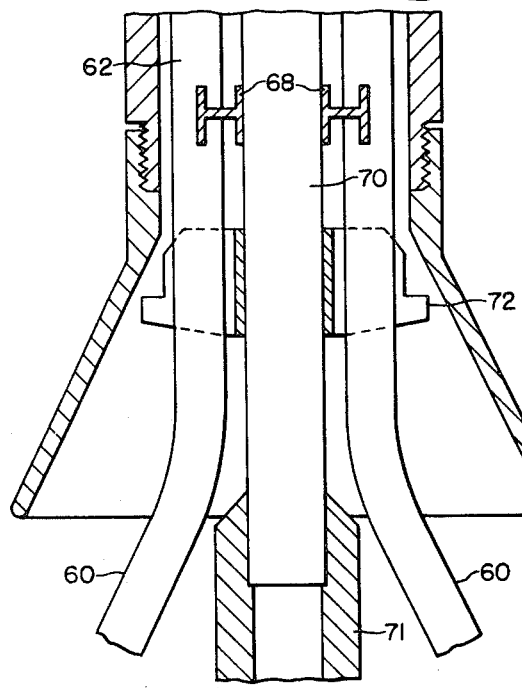
FIG. 7.
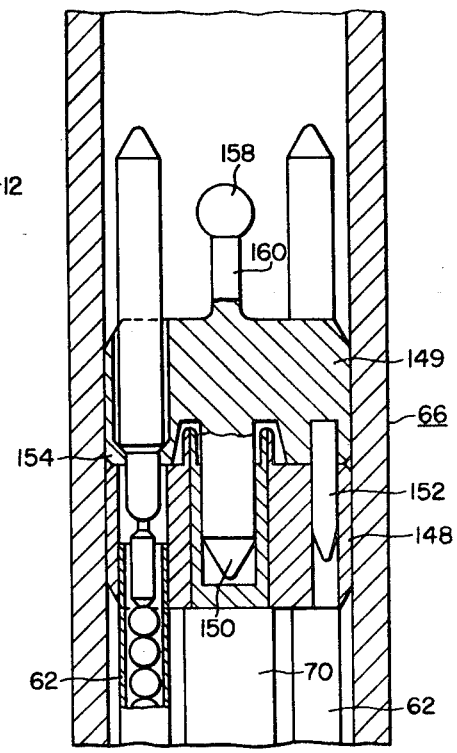
FIG. 13.
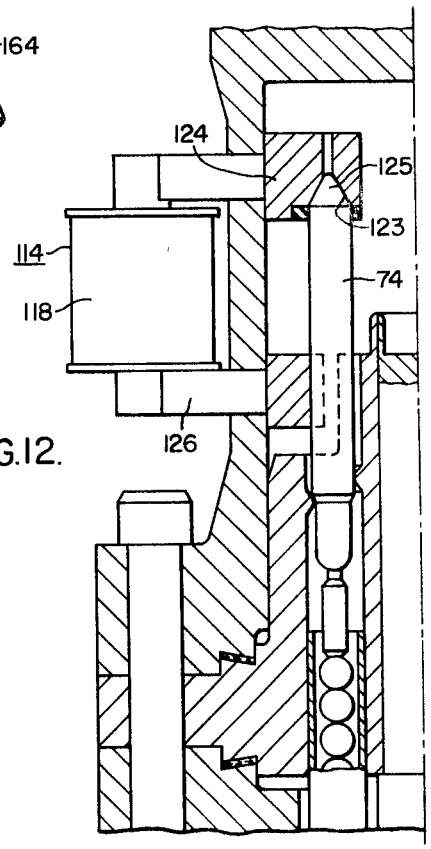
FIG. 12.

3,595,748
NUCLEAR REACTOR CONTROL DEVICE
Erling Frisch, Pittsburgh, Harry N. Andrews, Monroeville, and Howard E. Braun, Pittsburgh, Pa., assignors to Westinghouse Electric Corporation, Pittsburgh, Pa.
Filed Jan. 24, 1968, Ser. No. 700,253
Int. Cl. G21c 7/16
U.S. Cl. 176—36   9 Claims

ABSTRACT OF THE DISCLOSURE

A nuclear reactor is disclosed wherein a portion of its fuel assemblies have primary or shutdown neutron absorbing control elements coupled to incremental drive mechanisms, and a portion of its fuel assemblies have one or more individually movable auxiliary fine flux trim rods (FFT) coupled to new and improved two-position mechanisms. The two-position mechanisms are associated with curved guide channels in such a manner as to control the position of individual FFT rods associated with a plurality of fuel assemblies.

BACKGROUND OF THE INVENTION

This invention pertains to nuclear reactors, and more particularly to new and improved mechanisms which permit the neutron flux of such a reactor to be varied throughout the life of its reactive core in an improved efficient manner.

Prior art control systems generally relied upon either incrementally movable primary neutron absorbers or a generally diffused poison mixed with the moderator or a combination of both. The incrementally movable neutron absorbers frequently take one of the forms of: cruciform units containing the neutron absorber material situated between selected fuel assemblies; single absorber rods located at the center of selected fuel assemblies; or a plurality of clustered poison elements located in a spaced array and secured to a common spider (rod cluster control), with each cluster of control elements associated with selected fuel assemblies. Each of the control units of the prior art include a material of high neutron capture cross-section and each type of control units is coupled to mechanisms which incrementally lower or raise the control units relative to stationary fuel assemblies so as to respectively absorb more or fewer neutrons.

Where diffuse poison is used as a supplement to the primary control means, the diffuse poison is normally boric acid dissolved in the reactor coolant; and is used to lower the overall flux density of the core during its most reactive cycles.

A major problem in such systems of the prior art is that this system inherently produces a skewed or non-uniform axial flux distribution. If the control element is incrementally lowered into the reactive core from above, it tends to depress the flux at the top of the core while leaving the flux at the top of the core while leaving the flux at the bottom of the core at its previous higher level. In other words, it is the neutron flux bulge at the side of the core opposite the side of entry of the control unit that forms a limiting criteria for the operation of the prior art nuclear reactors. This bulge also results in a greater burnup of a portion of the reactive material adjacent the flux bulge and insufficient burnup of a portion of the remainder of the material. Moreover, the partial insertion of a control element can initiate xenon cycling which reduces the power level at which the reactor may safely operate.

The power level that may be safely sustained is also affected by the radial flux distribution. A plurality of flux peaks or hot channels may be expected to be present in any reactor. This can be the result of the distance of such a "hot channel" from the control elements, flux peaking water channels, and highly enriched fuel zones, as well as other factors. The locations of such "hot channels" change during reactor lifetime and are not satisfactorily predictable.

The problem of producing a uniform axial and radial flux distribution and at the same time compensating for excess reactivity in early cycles appeared insurmountable in spite of the fact that the causes were generally realized. Merely adding additional control units was thought impractical since their effect when fully inserted was too pronounced and because the expense of the mechanisms for these additional control elements would outweigh the economic advantages resulting from their use.

The number of control elements thus utilized in the prior art was essentially an economic compromise rather than an optimizing solution to the crucial problems involved.

SUMMARY OF THE INVENTION

This invention solves the aforementioned problems by utilizing a two-position mechanism to vary the location of widely dispersed neutron absorbers or control elements associated with a plurality of fuel assemblies in addition to normal incrementally movable control elements.

The two-position control elements, which may be properly considered fine flux trim rods, are suspended by flexible suspension elements from pistons. A plurality of these FFT rods are associated through curved guide channels with separate pistons in separate cylinders in a single two-position mechanism. One valve may be utilized which when opened will raise all the pistons and their associated fine flux trim rods to their withdrawn position. Selected pistons may then be electromagnetically secured in this position while the remainder are lowered under the influence of gravity into the core when the valve is returned to its closed position. Other embodiments utilize additional electromagnets to hold selected fine flux trim rods in their inserted position. In another embodiment, electromagnetic structure is utilized to raise the pistons.

The use of simple and relatively inexpensive two-position mechanisms to control widely dispersed fine flux trim rods allows the operator of a nuclear power plant to suppress "hot channels" or radial flux peaks without materially decreasing the overall power density and without causing axial flux perturbations or xenon cycling. This is only economically feasible because of the novel mechanism utilized which can control the FFT rods in a plurality of fuel assemblies, or in other words, in a plurality of spatially separated bundles of fissionable material.

This solution also decreases the amount of diffused poison to be mixed with the moderator since both radial and axial flux peaks are greatly decreased or eliminated.

DESCRIPTION OF THE DRAWINGS

FIG. 1 comprises an isometric view, partially in section, showing a reactor including the fine flux trim system of this invention;

FIG. 2 is an expanded view of a guide tube cut-away to show a fine flux trim rod;

FIGS. 5, 6 and 7, when placed end to end, comprise a cross-sectional view of a mechanism of this invention;

FIG. 8 is a cross-sectional view taken along line VIII—VIII of FIG. 6;

FIG. 9 is a cross-sectional view taken along line IX—IX of FIG. 5;

FIG. 10 is an elevational view of a means for coupling a ball cable to a piston;

FIG. 11 is a side elevation view of the coupling means of FIG. 10;

FIG. 12 shows a modified form of the electromagnetic holding structure of FIG. 5;

FIG. 13 shows a modified form of the support block of FIG. 6;

DESCRIPTION OF THE PREFERRED EMBODIMENTS

Figure 18:
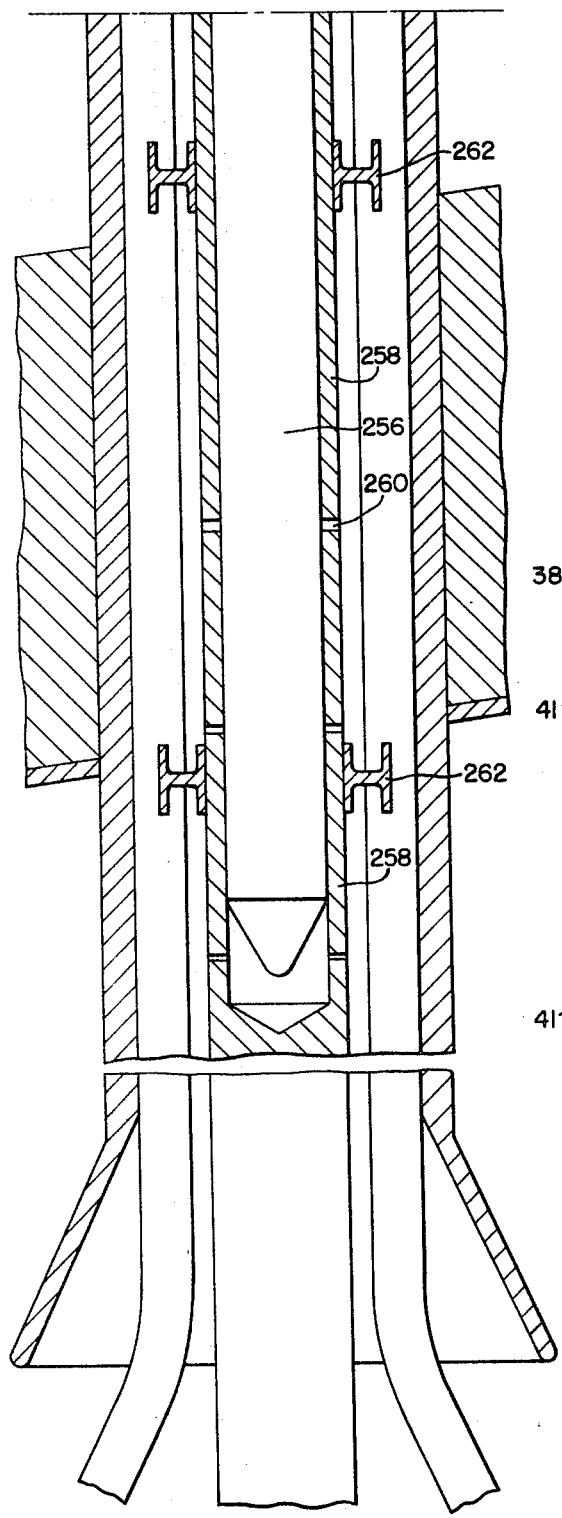
FIGS. 15, 16, 17 and 18, when placed end to end, comprise a cross-sectional view of another embodiment of this invention.

Referring to FIG. 1, there is illustrated a nuclear reactor incorporating the fine flux trim system of this invention. A pressure vessel 10 is shown which forms a tight pressurized container when sealed by cover head assembly 12 by suitable means (not shown). The pressure vessel 10 has coolant flow inlet nozzle 14 and coolant flow outlet nozzles 16 in the cylindrical wall thereof. The head assembly 12 has a plurality of head penetration adapters 18 sealed in and through its substantially hemispherical wall. The axis of each head penetration adapter 18 is in parallel alignment with the axis of the pressure vessel 10. A core barrel 20 is supportedly suspended from an upwardly facing shoulder 21 just below the top of the pressure vessel 10. An upper support plate 22, an upper core plate 24, and a lower core plate 26 extend transversely across and are supported by the core barrel 20. Coolant flow entering through inlet 14 proceeds to a bottom coolant manifold 28 through a flow annulus 30 formed by the lower wall of the pressure vessel 10 and the core barrel 20. The flow annulus 30 desirably contains a thermal shield 32. From the bottom coolant manifold 28, the flow proceeds generally axially upward through the area between the core plates 24 and 26 to an upper manifold region 34 from which it then proceeds through the outlet 16 to energy conversion structure not shown. The region between the upper core plate 24 and the lower core plate 26 is filled with a plurality of fuel assemblies 36; all of which are substantially identical.

Figure 3:
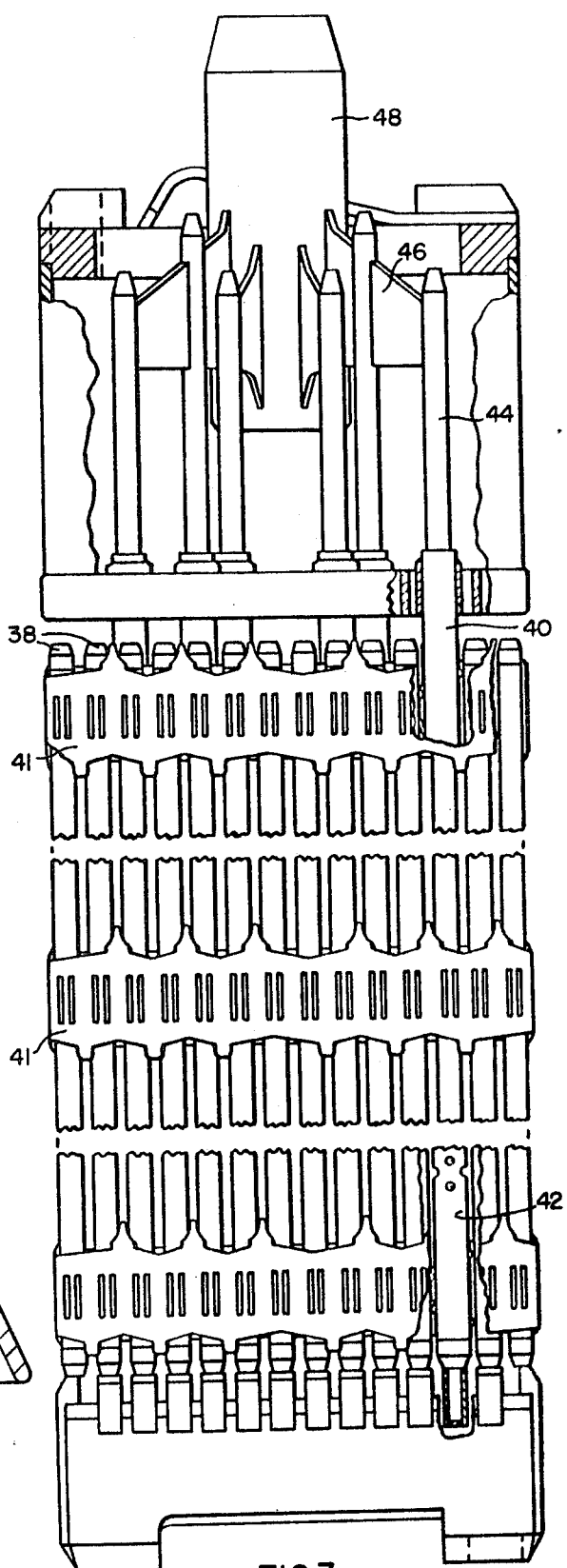
FIG. 3 is an elevation view, partially in section, of a fuel assembly having a rod cluster type control means therein.
Figure 4:
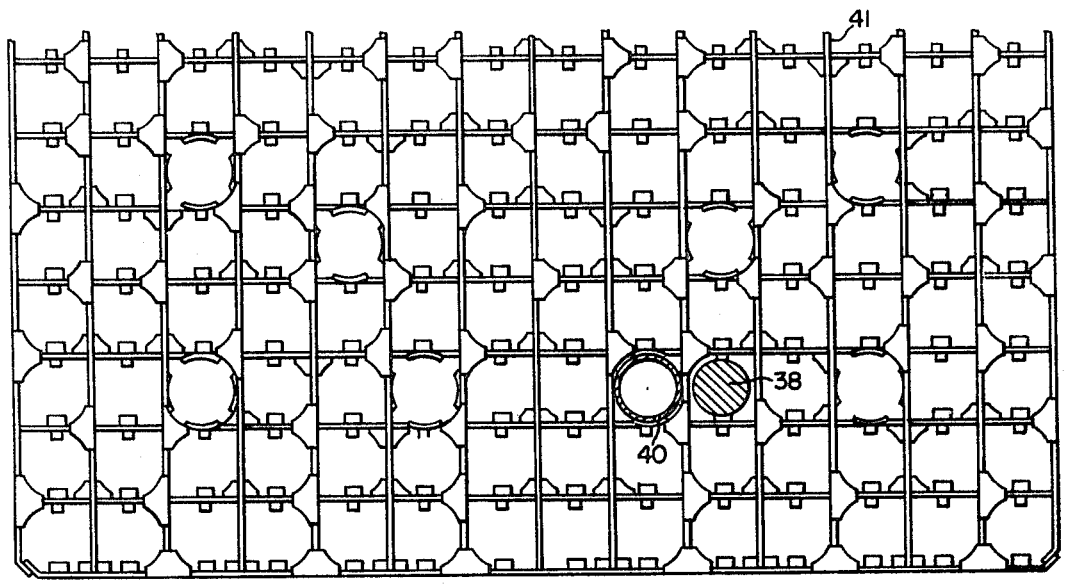
FIG. 4 is a plan view of a grid plate of a fuel assembly.

In this example, the parallel array of fuel assemblies 36 shown in FIG. 1 and shown in greater detail in FIGS. 3 and 4, include a plurality of fuel rods 38 and a plurality of guide tubes 40 interspersed therebetween and held in a fixed relationship each to the other by an egg crate type grid structure 41. This type of fuel assembly is shown and described in a copending application Ser. No. 552,976, filed May 25, 1966, now abandoned by R. J. Creagan and E. Frisch on a Fuel Assembly For Nuclear Reactors, and assigned to the present assignee. The guide tubes 40 may serve as receptacles for primary and shutdown control means such as rod cluster control (RCC) units, instrumentation, or fine flux trim rods 52 (as contemplated by this invention).

The individual fine flux trim rods 52 are of generally the same neutron absorbing configuration as the individual RCC units 42 employed in this example of the invention. The individual rods 52 and units 42 may comprise silver-indium-cadmium absorbers clad with stainless steel.

The worth of a single fine flux trim rod 52 is so calibrated that insertion of one such rod will not greatly reduce or change the power distribution of the entire core as would the insertion of a primary control rod 42. However, a single trim rod 52 would have enough worth to incrementally reduce the reactivity of its surrounding fuel elements.

The trim rods 52 are further designed to be either completely inserted or completely withdrawn from the core. This is only possible because of the above calibration of worth.

The above reactor configuration and the advantages of the control systems controlled by the mechanisms of this invention are described in greater detail in a copending application Ser. No. 700,152, now Pat. No. 3,551,289, filed of even date by W. Eich, G.H. Minton, R. French and H. Andrews for a nuclear reactor, and assigned to the present assignee. With such neutron control systems, an operator can spread the neutron absorber material throughout the core and vary the positions of the absorbers to compensate for hot channels without either materially reducing the power output of the reactor or producing the undesirable axially skewed flux distribution usually associated with such adjustments in the reactors using control rod types of the prior art.

The rod cluster control rod structure of the aforementioned copending application by E. Frisch and R. J. Creagan will now be briefly described. It should be clear, however, that this invention makes a more limited use of the primary control means such as that described in the copending application. A number of primary control devices are used in addition to the fine flux trim rods but not for the purpose of flux shaping. Referring to FIG. 3, the rod cluster control units 44 held in the guideways or guide tubes 40 are extended beyond the fuel rods 38 so that a non-absorber extension portion may be fixed to a spider 46 which in turn is fixedly attached to a mechanism drive rod 48. This mechanism rod 48 extends through the head penetration adapters 18 to a mechanism 50 (only the outward configuration of which is shown in FIG. 1). One example of mechanism 50 is described in Pat. No. 3,158,766, issued Nov. 24, 1967 to E. Frisch for A Gripper Type Linear Motion Device, and assigned to Westinghouse, and is designed to lift or lower the rod cluster control rods in small increments on the order of ⅜ to ⅝ of an inch for each lift or lowering cycle.

Although all of the fuel assemblies 36 have guide tubes 40, only about one-third of these assemblies in prior art reeactors generally have rod cluster control rods associated therewith. Although it is theoretically possible to utilize the relatively complicated structure normally used for the rod cluster control rods to lift and lower the fine flux trim rods, practically this would require a prohibitive number of head penetration adapters 18 and relatively large number of rather expensive mechanisms 50. The solution proposed is to provide relatively simple and relatively inexpensive mechanisms, each of which will lift and lower a number of fine flux trim rods 52 associated with a number of fuel assemblies 36.

To facilitate the description of an embodiment of this invention, several guide tubes 40 have been removed from their associated fuel assemblies 36 in FIG. 1, and one is shown in an expanded view with a fine flux trim rod 52 therein in FIG. 2. The upper portions of guide tubes 40 (which are to be used as receptacles for fine flux trim rods 52) are abutting lower guideways 54 located between upper core plate 24 and upper support plate 22. These lower guideways 54 are aligned with and are essentially extensions of the guide tubes 40. However, the lower guideways 54 desirably are not affixed to the guide tubes 40 since the lower guideways 54 must be lifted from the reactor when the head assembly 12 and the upper structure is removed for refueling; as will be explained. A spider 56 rigidly affixed to support column 58 prohibits lateral movement of the lower guideways 54. Above the upper support plate 22, curved guide channels 60 form extensions of the lower guideways 54. The lower ends of the curved guide channels 60 are aligned with and abutting the upper ends of the lower guideways 54, while the upper portions of the curved guide channels 60 are aligned with and affixed to fine flux trim upper guideways 62 (see FIG. 7) which extend a substantial distance into the head penetration adapters 18. By use of the curved guide channels 60, each mechanism can operate trimming rods 52 located in channels substantially offset from the axis of the mechanism.

Supported on some of the head penetration adapters 18 are fine flux trim lifting and lowering mechanisms 64. The fine flux trim mechanism 64 is a considerably simpler structure than the rod cluster control mechanism 50 since the mechanism 64 is only required to vary the position of the fine flux trim rod 52 from a first position of being completely inserted in the guide tubes 40 to a second position of being completely out of guide tubes 40. This should be contrasted with the operation of the rod cluster control mechanism 50 which, as mentioned, must be sufficiently precise to locate the rod control cluster rods at a large number of predetermined positions intermediate the ends of the fuel assembly. In other words, the mechanism 50 must be able to move its associated rods incrementally up and down whereas the mechanism 64 need only move its associated rods completely up to one predetermined extreme position or allow them to go completely down to another predetermined extreme position.

The mechanism 64 for fine flux trim members forming a part of this invention may take several different forms one of which is shown in FIGS. 5 and 6. As pointed out previously, each mechanism 64 is mounted on a head penetration adapter 18. Each head adapter 18 receives the upper guideways 62 therein and also contains structure which cooperates with mechanism 64 to achieve reliable withdrawal and insertion of trimming rods 52. More particularly, penetration adapter 18 includes a number of fixtures 68 located therein to provide further support for upper guideway 62. Each fixture 68 is affixed to a central support rod 70 having a lower extension 71 which is attached to the upper support plate 22 (FIG. 1).

A spider shaped flange 72 is provided in adapter 18 at the lower end of the support rod 70 which also supports and aligns the upper guideways 62. A ledge 76 in a guide block 66 serves as a downward stop for pistons 74 (to be described). The lower ends of the pistons 74 are attached to a guide line or ball cables 78; as will be described. The lower ends of the ball cables 78 are in turn respectively attached to the fine flux trim rods 52; see FIG. 2.

The ball cables 78, seen best in FIGS. 10 and 11, may comprise a number of stainless steel balls 80 having opening therethrough so as to slide onto a wire cable 82. A suitable size for the balls 80 is 7/16 inch in diameter which permits them to fit into an approximately 1/2 inch diameter upper guideway 62 without binding therein. Such an arrangement provides low friction and maximum flexibility in the curved sections as well as additional weight on the wire guide cable of the guide line to assist downward motion of the fine flux trim rods 52. One suitable securing means for the ball cable and piston is illustrated. In this example, the ball cable 78 terminates in a locking cylinder 84 which has a ball 86 affixed to the tip thereof. The lower end of the piston 74 has a cup 88 formed thereon. This cup has a hole 89 slightly larger than the ball 86 in a side thereof, and a narrow slot 90 extending downwardly from the hole 89. The ball 86 may be extended into the hole 89, while in a horizontal position, and then may be lowered to its vertical position through the slot 90. After a ball cable 78 is inserted in the guide tube 62, accidental upcoupling is rendered impossible.

As indicated, the trim rods 52, in their in-core position, hang on the ball cables 78 attached to pistons 74, which are supported on a ledge 76 so as to prohibit further downward movement. The trim rods 52 are moved from their lower or in-core position (at left in FIGS. 5, 6 and 7) to their upper position or out-of-core (at right in FIGS. 5, 6 and 7) through an upper guideway extension 92 located in mechanism 64. In order to produce the force required to lift the pistons 74, an upper cavity 94 is connected to a low pressure water retention tank 96. Energizing the coil 98 of a magnetic valve 100 lifts a tapered valve tip 102 from its associated seat 104. With the valve tip in its up-position, the upper cavity 94 is connected through channels 106 and 107 to the low pressure tank 96. An orifice 108 mounted externally or internally of the mechanism 64, and a heat exchanger 110 are also connected between the upper cavity 94 and the low pressure source 96 to increase performance of the system. With the pistons 74 in their upper position, the mechanism 64 and associated trim rods 52 are so dimensioned as to be completely withdrawn from the core region into the lower guideways 54. The trimming rods 52 are substantially inactive in the last-mentioned position. The trimming rods 52 are selectively returned to their in-core position under the action of gravity when the coils 98 are deenergized allowing the tapered valve tip 102 to close since the pressure difference across piston 74 no longer exists.

A plurality of electromagnets 114 are arranged symmetrically about the mechanism head and positioned adjacent the topmost position of the pistons 74. The pole pieces 116 of the electromagnets 114 penetrate the mechanism head and are fixedly attached thereto such that the longitudinal center line of the pole pieces intersects the longitudinal center line of the pistons 74. When the magnetic coils 118 of the electromagnet 114 are selectively energized, the corresponding pistons 74 are pulled toward the pole pieces 116 where they are held by that portion of the pole piece 116 which is nearest the piston and which is shaped to conform to the outer surface of the piston. A tapered portion 120 of the piston 74 is also caused to abut a ledge 122 which aids in holding the piston in its top position. It can therefore be seen that when the valve 102 is closed and the low pressure or upper cavity 94 returns to normal system pressure those pistons 74 which are adjacent to deenergized magnetic coils 118 will return to their lower or in-core positions under the action of gravity. The trim rods 52 associated with the last-mentioned pistons 74 will then be completely inserted in their respective fuel assemblies 36.

An alternative design for the upper pole piece of the electromagnets 164 of FIG. 5 and designated by the numeral 124 is shown in FIG. 12. Here the pole piece 124 is provided with a conical indentation 128 which conforms to the shape of the piston tip 125. When the electromagnet is then energized the piston will be held by direct magnetic pull in addition to the friction effect developed by the lower pole piece 126.

If a change is required in the positioning of one or more rods 52 in a group controlled by a single mechanism, either of the two procedures below would be followed:

(1) If the change consists of inserting one or more trim rods 52 suspended by electromagnets 114, it is only necessary to deenergize the associated coils 118 and the rods will drop in the all-in position under the action of gravity.

(2) If one or more rods 52 must be withdrawn from the all-in position, it is first necessary, in this embodiment, to withdraw all of the rods by opening valve 102 to connect the upper cavity 94 to the low pressure tank 96 as indicated above. When all of the rods are in the upper position, the magnetic coils 118 may be selectively energized to hold magnetically in the withdrawn position adjacent trim rods 52 which are to remain withdrawn. When the upper cavity 94 is returned to normal pressure, the rods 52 not held in position by the energized ones of coils 118 will then fall under gravitational forces into the core.

Since reactors must from time to time be refueled, the head assembly 12 must be removed. It is to be noted that the head penetration adapters 18 as well as mechanisms 50 and mechanisms 64 are removed as a part of the head assembly 12. Next the upper structure comprising essentially the upper core plate 24 and the upper support plate 22 along with the structure attached thereto is removed, but before this operation can be accomplished the fine flux trim rods 52 must be fully retracted into the lower guideways 54. Since the trim rod drive mechanism 64 has been removed with the head assembly 12, special means must be provided to withdraw the fine flux trim rods 52 manually. For this purpose tubular metal stacks (not shown) are placed over the upper end of the central support column 70. The stacks are so dimensioned as to provide a close fit with the guide blocks 66 while their lower ends rest on spider 72. A special elongated handling tool (not shown) is then lowered into the stacks where it is manipulated to grab all of the pistons 74. An annular indentation 146 is provided near the top of the pistons 74 in order to facilitate this operation. When this tool is withdrawn upwardly all of the trim rods 52 associated with the pistons 74 are completely retracted into the lower guideways 54. A latching means (not shown) may be provided at the upper end of each stack to secure all of the pistons and to hold the trim rods 52 in place when the handling tool is removed. The upper support structure may then be completely removed from the reactor allowing access to the fuel assemblies 36.

An alternate design of guide block 66 is shown in FIG. 13 which greatly simplifies the rod retracting operation. The central guide block of this figure is made in two separate parts. A lower stationary block 148 is secured to the support column 70 by suitable means as by welding and serves as the upper support for the upper guideways 62. An upper block 149 which is removable is then accurately located on the lower block by a central locating pin 150 and an alignment pin 152 to ensure alignment of the holes of the pistons 74. A ledge 154 desirably is provided in the holes in the upper block 149 which serves to prevent any further downward movement of the pistons 74. The upper block 149 is also provided with a ball-shaped tip 158 at the end of a cylindrical extension 160 which serves as a means for attaching a handling tool after the withdrawal stacks are in place. When this handling tool is lifted, all the pistons 74 and the trim rods 52 associated therewith are withdrawn as a unit. A simple latch may be provided at the upper end of the stacks which catches on the under side of the removable block 149 so as to hold this block and the associated flux trim rods in a secure manner.

After the refueling operation has been completed the upper support structure is lowered into the reactor vessel 10 and the head assembly 12 is replaced. This is a relatively simple operation, but it is necessary to ensure alignment of the lower guideways 54 with the guide tubes 40. Various alignment means (not shown) may be provided to ensure proper completion of this last-mentioned operation. It may also be noted that a funnel 164 is provided at the lower end of the head penetration adapters 18 to assist in guiding the support rod 70 with the associated upper guide lines into the head adapters when the head is replaced.

Proper operation of the fine reflux trim structure may be ascertained in a simple manner. An AC signal may be super-imposed on the DC current of the holding magnet to ascertain which pistons 74 are in their uppermost position. The coil impedance will be higher in the latter case than when a piston has been accidentally dropped or has been unable to complete its upward movement due to some mechanical misalignment.

For purposes of ease of assembly, the fine flux trim mechanism 50 is desirably constructed essentially of three sections, an upper mechanism structure 128 supporting the magnetic valve 100 and the electromagnets 114, an intermediate mechanism structure 138 and a third section formed by the head penetration adapters 18. The outwardly extending flange 132 of the upper mechanism structure 128 may be affixed to the intermediate mechanism structure 138, having an outwardly extending flange 134, by utilizing alignment pin 168 to ensure proper alignment and bolts 130 to tighten seal rings 136 in place. Likewise, the intermediate mechanism structure 138 may be affixed to the head penetration adapters 18 by utilizing alignment pin 166 and bolt 142. Here also a suitable mechanical seal ring 140 is provided to insure a leak-proof joint.

Figure 14:
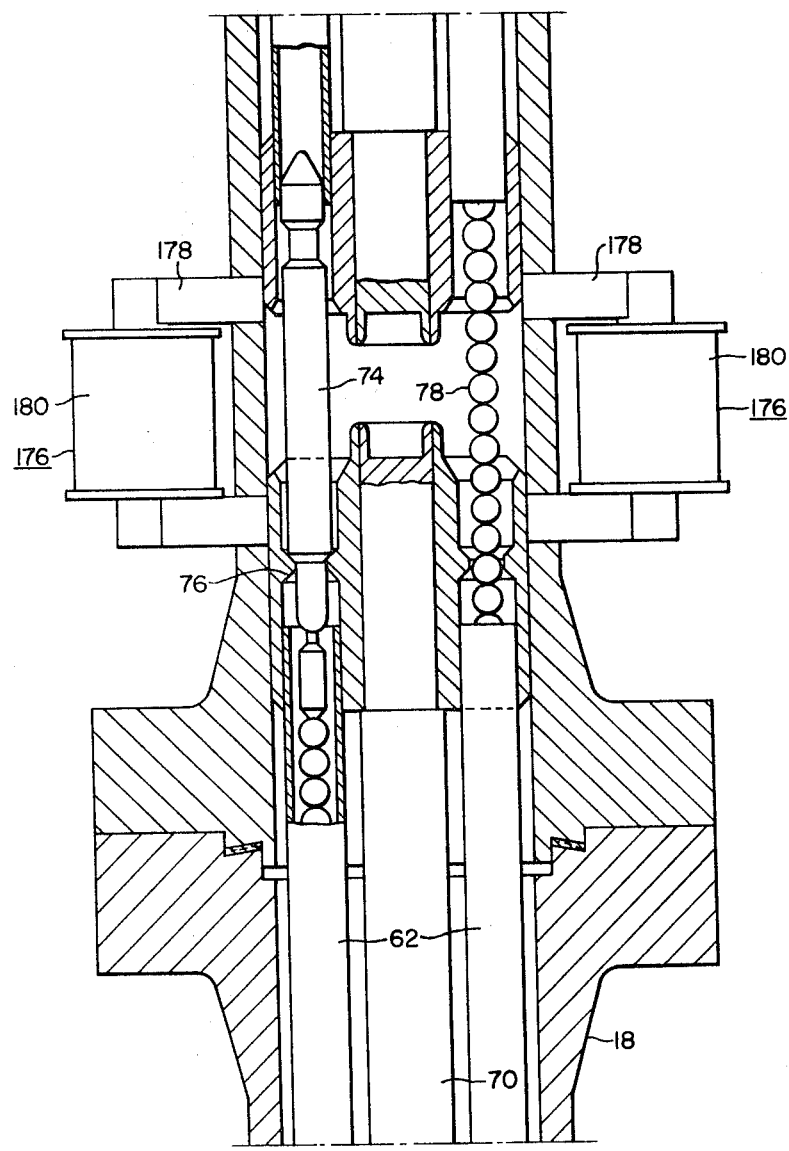
FIG. 14 is a cross-sectional view of a modification of this invention.
Figure 15:
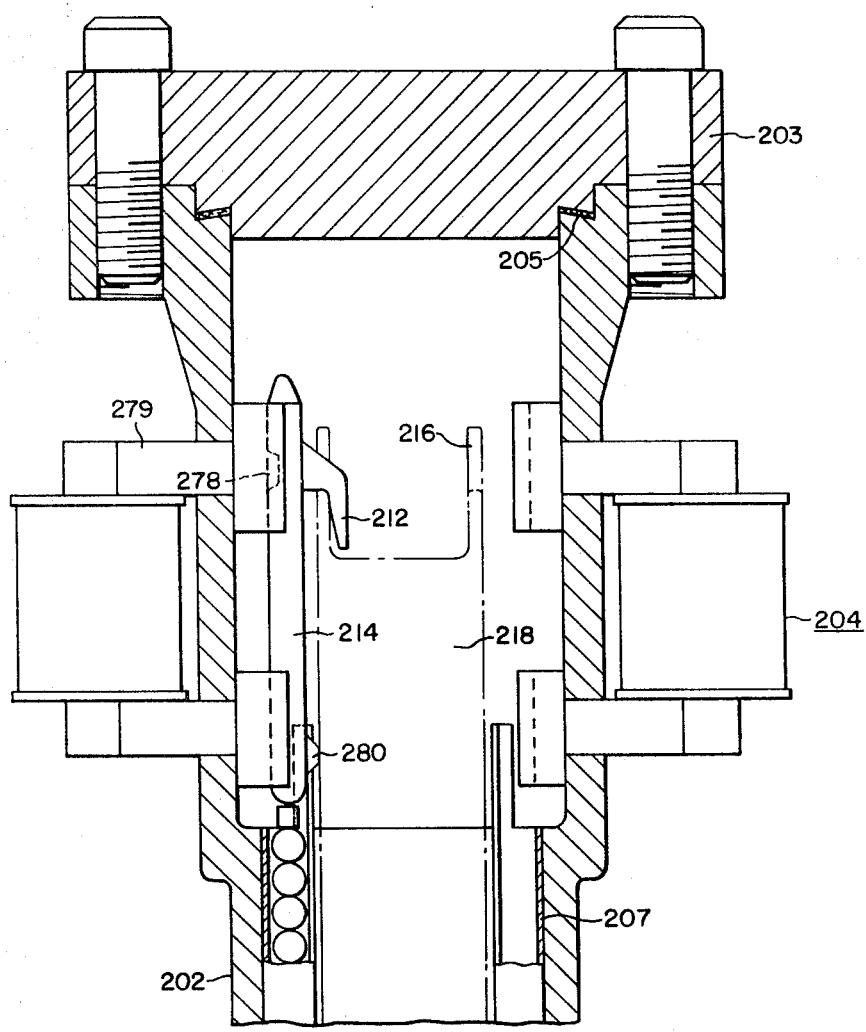

Referring now to FIG. 14, a modification is shown to eliminate the necessity of lifting all of the fine flux trim rods 52 when withdrawal of less than all the rods 52 from the core is desired. Electromagnets 176 with pole pieces 178 and magnet coils 180 are provided at the location of pistons 74 when the fine flux trim rods 52 are in their all-in position. It is then only necessary to energize selectively the magnetic coils 180 associated with the pistons 74 having fine flux trim rods 52 which are to remain in the core, before opening the magnetic valve 100. These pistons 74 will then be held in a fixed manner and will not be drawn upward by the change in differential pressure. It will be noted that in order to place the electromagnets 176 adjacent to the lowest position of the pistons 74, it is necessary to move the flanges and their associated structure further down the head penetration adapter 18. In other words, the upper guideways 62 then extend further above the top of the head penetration adapter 18, as may be clearly noted in FIG. 14.

Figure 19:
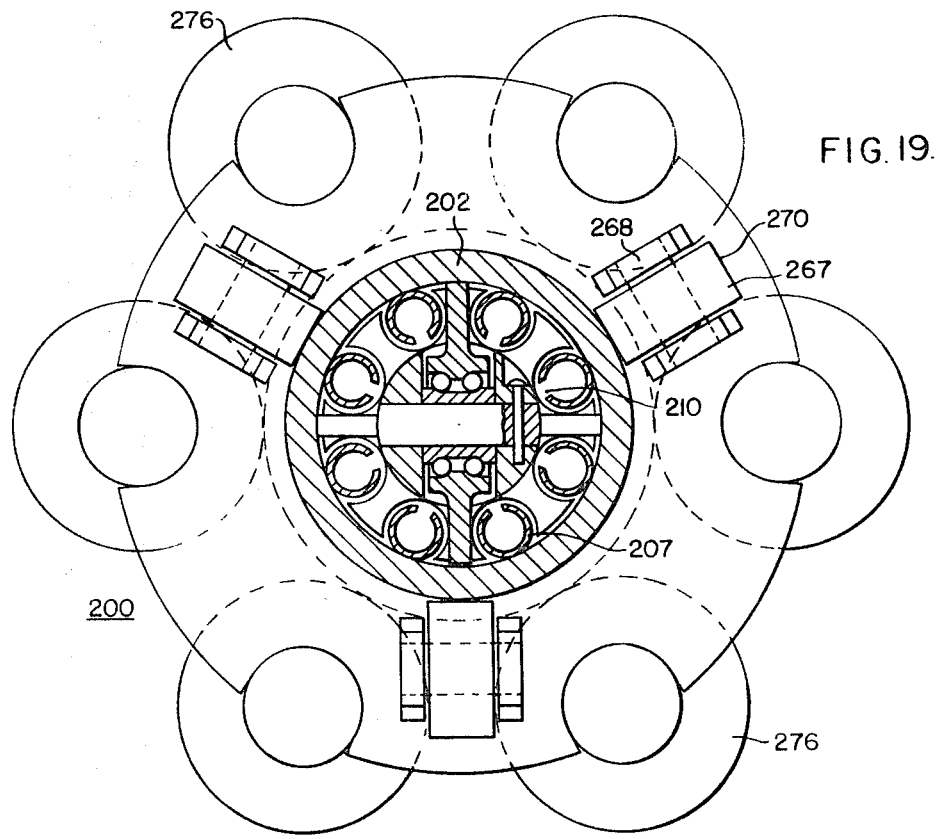
FIG. 19 is a cross-sectional view taken along lines XIX—XIX of FIG. 16.

An alternative electromechanical fine flux trim rod lifting mechanism is shown in FIGS. 15 through 18, taken end to end; and FIG. 19. This mechanism is capable of accomplishing the same functions as its hydraulic counterparts.

An electromechanical runner 200, which may be lifted or lowered by any suitable means such as a chain hoist, is movably mounted on the exterior surface of the intermediate mechanism pressure housing structure 202. It can be seen that pressure structure 202 is sealed just above the upper holding electromagnets 204 by a cover member 203 and a suitable sealing means 205 such that the entire mechanism when assembled takes the form of a pressurized housing.

Head penetration adapters 208 are provided with upper guideways 206 therein. Guideway extensions 207 are provided in intermediate mechanism structure 202 to guide the pistons 214. These members are essentially identical with their corresponding members in the hydraulic embodiment. However, longitudinally extending slots 210 are provided in the radially inward surface of the guideway extensions 207 to accommodate projections 212 of the pistons 214 (see FIG. 19). The piston projections 212 are constructed so as to fit over an upwardly extending annular and slotted flange 216 of a lifting block 218.

Figure 16:
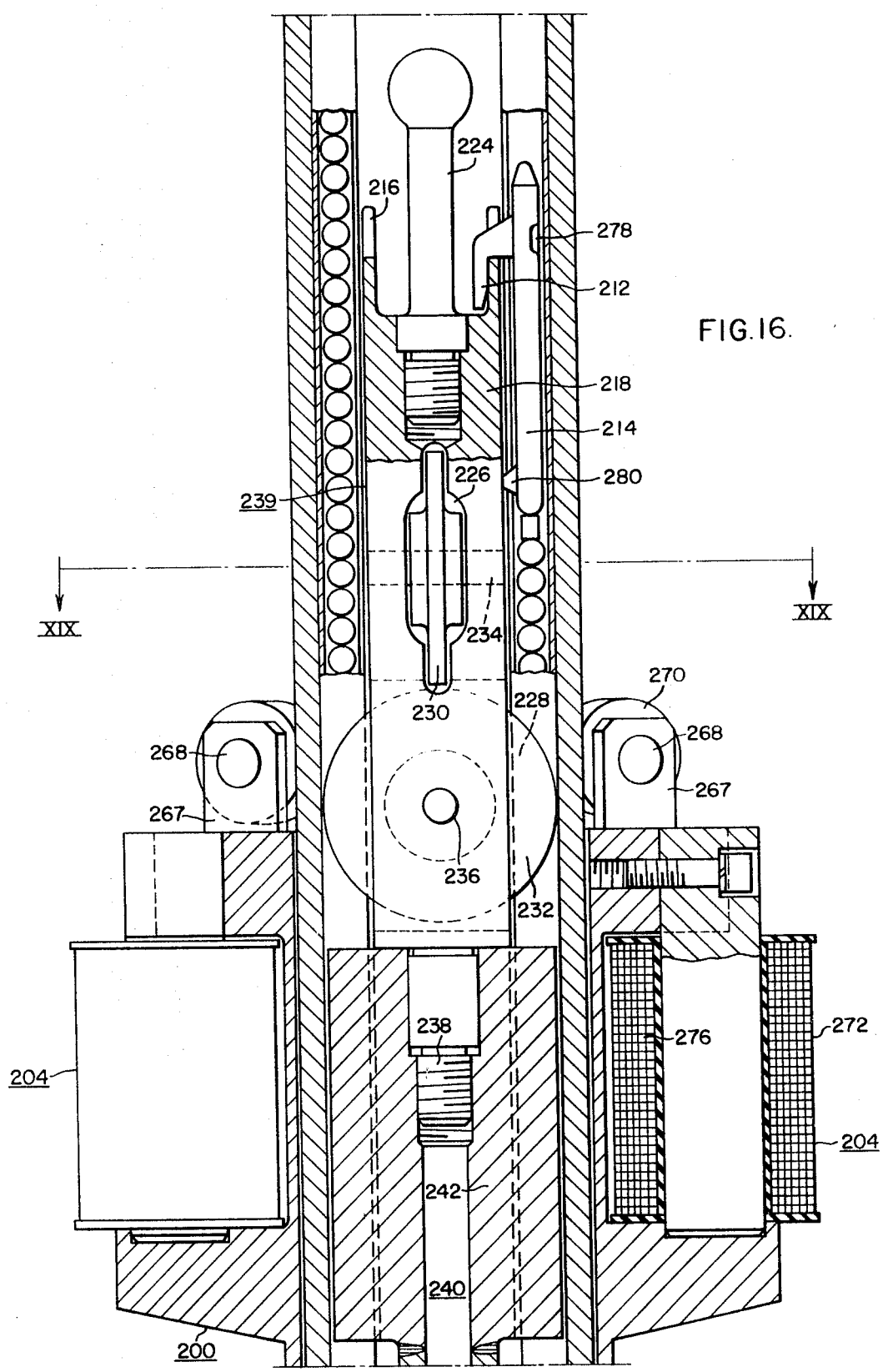
Figure 17:
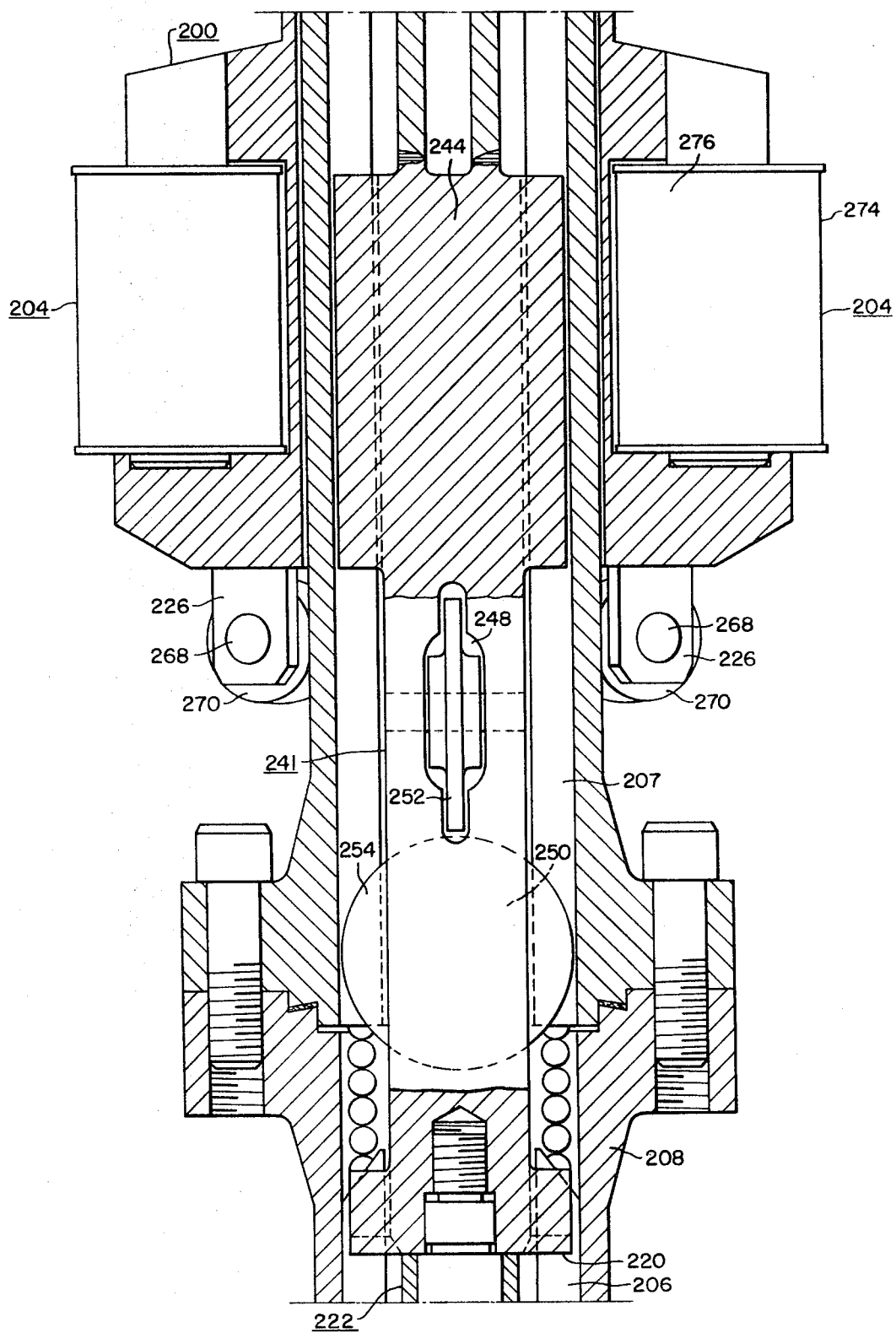

The lifting block 218 is essentially an elongated cylinder constructed in several sections and having cutout portions therein. The cylinder extends from the upwardly extending flange 216 to a lower end 220 which in its lowered position (as shown in FIGS. 16 and 17)

rests on the top of the central support rod 222 which corresponds to the support rod 70 of FIG. 6. The upper section 239 of the lifting block or cylinder 218 is made of a non-magnetic material, and has a rod and ball attachment 224 fitted into its top surface so that it may be grasped by a handling tool in the manner explained in connection with the hydraulic embodiments. Two openings 226 and 228 are provided in upper portion of lifting cylinder 218 to accommodate perpendicularly oriented guide wheels 230 and 232 which rotate on their corresponding axles 234 and 236 so as to assure free movement of the lifting block 218. A post and threaded screw projection 238 at the lower end of the non-magnetic section 241 assures firm attachment to a magnetic section 240. The magnetic section 240 may be seen to be constructed of three pieces, two of which are magnetic, an upper magnetic cylinder 242 and a lower magnetic cylinder 244. Between these two cylindrical portions, a non-magnetic cylinder 246 is secured, as by welding. This arrangement is utilized to assure proper flux paths with the electromagnetic runner 200, and more specifically the electromagnets 214, as will be described. There are also two openings 248 and 250 in the lower magnetic cylinder which have lower guide wheels 252 and 254 cooperating therewith. These last-mentioned means are supported and function in the same manner as the upper guide wheels 230 and 232 and cooperate with the upper wheels 230 and 232 to assure low friction of lifting block 218.

A shock absorbing piston 256 is fitted to the lowest portion of the cylindrical lifting block 218. To obtain a highly damped system, the piston 256 extends for some distance into a cylindrical drilled sleeve portion 258 of the central support rod 222. The sleeve portion 258 has numerous small holes 260 drilled in its outer wall to allow the damping fluid to escape therefrom as the piston 256 is forced into the sleeve 258 by the downward movement of the lifting block 218. It may be noted that the central support column 22 has various fixtures 262 which ensure proper alignment and support of the guideways 206.

The electromechanical runner 200 is generally annular in cross-section (see FIG. 19) and is constructed of magnetic material having an inner diameter slightly larger than the outer diameter of the intermediate mechanism structure 212. A plurality of upwardly and downwardly extending projections 226 support axles 268 for guide wheels 270. These guide wheels 270 assure low friction upward and downward movement of the electromagnetic runner 200. As indicated, any suitable means, such as a chain hoist, may be used to lift and lower this runner 200. Two sets of electromagnets, an upper set 272 and a lower set 274 are bolted to the electromagnetic annulus. As shown, each set of electromagnets contains 6 separate magnetic coils, all of which are designated 276. When these sets of magnetic coils are energized, the lifting block 218 is held in a stationary relationship to the electromagnetic runner 200. The electromagnetic runner 200 and the lifting block 218 are shown in their lowest position in FIGS. 16 and 17. The piston 256 may be seen to be fully extended into its damping cylindrical sleeve 258 in this view.

When it is desired to lift the fine flux trim rods out of the reactor core, the electromagnets 276 are first energized. The electromagnetic runner 200 is then hoisted into its upmost position with magnetic forces carrying the lifting block 218 with it; as may be seen in FIG. 17.

Arranged radially about the top of the intermediate structure 202 and adjacent the upper position of the pistons 214, are holding electromagnets 204, as mentioned. When it is desired to lower less than all the fine flux trim rods into the reactor core, the magnetic coils, adjacent to the pistons connected to those rods which are not to be lowered, are energized thus holding the corresponding pistons firmly against the pole pieces associated with these electromagnets. A cutout portion 278 may be arranged to cooperate with pole piece projections 279 to facilitate holding the pistons. Projections 280 extend inwardly from the lower portions of the pistons 214 which cooperate with projections 212 to assure proper alignment of the pistons 214 to the slots 210 as they are lifted or lowered. After the selected pistons and their associated fine flux trim rods are firmly held by their corresponding pole pieces of electromagnets 204, the runner 200 may then be lowered to the position shown in FIGS. 16 and 17 thus inserting the selected rods into the reactor core.

It will, therefore, be apparent that there has been disclosed fine flux trim mechanisms which enables a nuclear reactor to be controlled more simply and at a higher level of efficiency.

While there have been shown and described what are at present the preferred embodiments of the invention, modifications thereto will readily occur to those skilled in the art. It is not, therefore, desired that the specific illustrative arrangement be limitative of the invention, and it is rather desired that the appended claims cover all such modifications as fall within the scope of the invention.

We claim as our invention:

1. A nuclear reactor comprising, in combination:
   a vessel subject to substantial internal pressure, said vessel having a nuclear core, fixedly positioned therein;
   a plurality of fuel assemblies comprising said nuclear core, each of said fuel assemblies including a plurality of fuel rods and a plurality of control element channels interspersed among said fuel rods;
   a plurality of pressure bearing housings sealed in and through complementary apertures in a wall of said vessel and extending outwardly therefrom;
   a plurality of control elements situate for telescoping movement within the channels of selected fuel assemblies;
   a plurality of means completely within each of said housings, each means of said plurality of means being coupled to a control element for moving said control element, motive means with each of said housings for simutaneously moving each means of said plurality of means, said plurality of moving means within each housing being coupled to control elements situate within more than one fuel assembly.

2. The nuclear reactor of claim 1 wherein the means for moving the control elements can assume two positions for completely inserting or completely withdrawing said control elements relative to said reactor core.

3. The nuclear reactor of claim 2 wherein said moving means for completely inserting or completely withdrawing said control elements includes flexible guide lines coupled to said control elements, and guide line actuators coupled to said flexible guide lines, whereby said guide lines and said control elements may be raised and lowered.

4. The nuclear reactor of claim 3 wherein said vessel is maintained at a predetermined pressure and the guide line actuators comprise pistons, cylinders associated with said pistons, and a source of pressure lower than said predetermined pressure coupled to said cylinders such that the higher pressure inherent in the lower part of the system will force the pistons to the top of the cylinders, and means for holding selected pistons at at least one of its two positions.

5. The nuclear reactor of claim 4 wherein said pistons are of a material capable of being magnetized, and said holding means comprises magnetic means associated with each piston and positioned to hold said pistons there adjacent.

6. The nuclear reactor of claim 4 wherein said holding means are located at each of said two piston positions.

7. The nuclear reactor of claim 5 wherein the said holding means also comprise a support block structure including a lower block supported by a head penetration adapter, an upper block supported by said lower block and having an inwardly extending section, said pistons having means for engaging the said inwardly extending section of the said upper guide block, and means on the said upper guide block whereby all of the pistons may be raised after the head assembly has been removed.

8. The reactor of claim 1 wherein each of said control elements comprises a fine flux trim rod.

9. The nuclear reactor of claim 2 wherein said moving means for completely inserting or completely withdrawing said control elements include, flexible guide lines coupled to said control elements, a lift block of magnetic material, projections coupled to said guide line and supported by said lift block, means magnetically coupled to said lift block, and means for raising and lowering said means magnetically coupled to said lift block.

References Cited

UNITED STATES PATENTS

| | | | |
|---|---|---|---|
| 3,178,356 | 4/1965 | Wheelock | 176—33 |
| 3,264,952 | 8/1966 | Winders | 176—36 |
| 3,347,747 | 10/1967 | West et al. | 176—35 |
| 3,361,635 | 1/1968 | Long | 176—35 |

CARL D. QUARFORTH, Primary Examiner

H. E. BEHREND, Assistant Examiner